United States Patent Office 3,642,835
Patented Feb. 15, 1972

3,642,835
PROCESS FOR THE PRODUCTION OF
ANTHRAQUINONE DYESTUFFS
Volker Hederich and Gunter Gehrke, Cologne, Germany, assignors to Farbenfabriken Bayer Aktiengesellschaft, Leverkusen, Germany
No Drawing. Filed Nov. 26, 1968, Ser. No. 779,205
Claims priority, application Germany, Dec. 5, 1967,
P 16 44 621.2
Int. Cl. C09b 1/54
U.S. Cl. 260—376
3 Claims

ABSTRACT OF THE DISCLOSURE

Synthetic fiber materials, particularly polyesters, may be dyed and printed with anthraquinone dyestuffs corresponding to the formula:

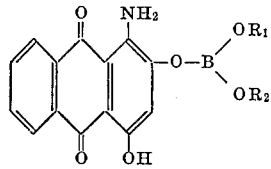

in which B stands for the radical

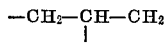

or for the radical

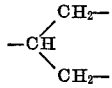

wherein $R_1$ stands for hydrogen or for an optionally substituted aryl radical, and $R_2$ stands for an optionally substituted aryl radical or for an optionally substituted hydroaromatic radical.

---

The object of the present invention comprises anthraquinone dyestuffs of the formula

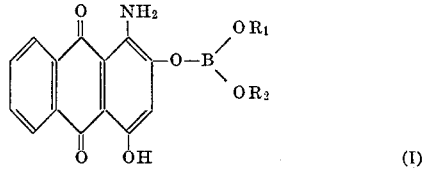

as well as a process for their production and their use, for the dyeing and printing of synthetic fibre materials. In the Formula I B stands for the radical

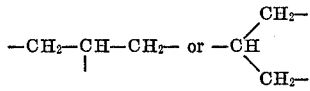

$R_1$ stands for hydrogen or for an optionally substituted aryl radical, and $R_2$ stands for an optionally substituted aryl radical or for an optionally substituted hydroaromatic radical.

Suitable aryl radicals are particularly phenyl radicals which may contain substituents, such as halogen, especially chlorine and bromine, alkyl, alkoxy, alkylcarbonyl, alkylthio and phenyl groups, and the alkyl and phenyl groups themselves may contain further substituents.

Preferred are those dyestuffs of the formula

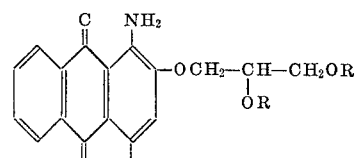

in which one R stands for an optionally substituted aryl radical or for a hydroaromatic radical, and the other R represents hydrogen, as well as those of the formula

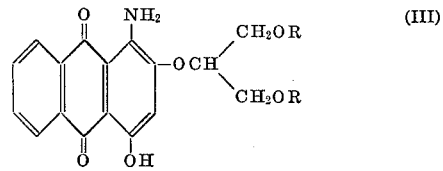

in which R stands for the same or for different, optionally substituted aryl radicals.

The dyestuffs of the Formula I are obtained by reacting 1-amino-4-hydroxy-anthraquinones of the formula

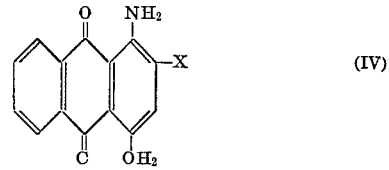

in which X represents an exchangeable substituent, with glycerol-aryl ethers of the formula

in which B, $R_1$ and $R_2$ have the same meaning as above, in the presence of strongly alkaline compounds, optionally in the presence of suitable solvents, at temperatures of about 100–160° C., preferably 120–140° C.

The reaction is preferably carried out in an excess of (V) which simultaneously serves as solvent. Further suitable solvents are, for example, dimethyl formamide, N-methyl-pyrrolidone or pyridine.

Suitable strongly alkaline compounds are, for example, sodium or potassium hydroxide or carbonate. Exchangeable substituents X are primarily: halogen, such as chlorine and bromine, alkoxy groups, sulphonic acid groups or aryloxy groups.

Suitable 1-amino-4-hydroxy-anthraquinones of the Formula IV are, for example:

1-amino-4-hydroxy-2-phenoxy-anthraquinone, 1-amino-4-hydroxy-2-p-chlorophenoxy-anthraquinone, 1-amino-4-hydroxy-2-methoxy-anthraquinone, 1-amino-4-hydroxy-2-bromo-anthraquinone, 1-amino-4-hydroxy - 2 - chloro-anthraquinone, 1-amino-4-hydroxy-anthraquinone - 2 - sulphonic acid.

Suitable glycerol aryl ethers of the Formula V are, for example: glycerol - 1 - mono-phenylether; glycerol-1-mono-(p-chlorophenyl)-ether; glycerol - 1 - mono - (o,p-dichlorophenyl)-ether; glycerol - 1 - mono - (o - methoxyphenyl)-ether; glycerol-1-mono-(o - ethylphenyl) - ether; glycerol-1-mono-(m,p-dimethylphenyl)-ether; glycerol-1-mono-(p-methylmercapto - phenyl) - ether; glycerol-1-mono-(m-methyl-p-methylmercapto-phenyl) - ether; glycerol-1-mono-(α-naphthyl) - ether; glycerol-1-mono-cyclohexyl-ether; glycerol - 2 - mono - phenylether; glycerol - 2-mono-(m-methylphenyl)-ether; glycerol - 1,3 - diphenyl-ether; glycerol-1,3-di-(o - chlorophenyl) - ether; glycerol-1,3-di-(m - chlorophenyl) - ether; glycerol - 1,3 - di - (p-chlorophenyl)-ether; glycerol - 1,3 - di - (o,m'-di-chlorophenyl) - ether; glycerol - 1,3 - di - (o - chloro - m'-methyl-phenyl)-ether; glycerol-1,3-di-(m - methylphenyl)-ether; glycerol-1,3-di-(p-methylphenyl)-ether; glycerol-1,-3-di-(p-tert.butylphenyl)-ether; glycerol-1,3-di-(p-phenyl-phenyl)-ether; glycerol-1,3-di-(α-naphthyl-ether; glycerol-1,3-di-(o-methoxyphenyl)-ether; glycerol - 1,3 - di - (m-methoxyphenyl)-ether; glycerol-1,3 - di - (p - methylmer-capto-phenyl)-ether; glycerol-1,3 - di - (p - acetophenyl)-ether; glycerol-1-phenyl-3-(p-methylphenyl) - di - ether; glycerol - 1 - phenyl - 3 - (p-phenyl-phenyl) - di - ether; glycerol-1-phenyl-3-(p-chlorophenyl)-di - ether; glycerol-1-phenyl-3-(p-methylmercapto-phenyl)-di-ether; glycerol-1-(o-ethoxyphenyl)-3-(p-chlorophenyl)-di-ether; glycerol-1 - (o-methoxyphenyl)-3-(p-chlorophenyl)-di-ether; glycerol-1-(p-methyl-phenyl)-3-(o-chlorophenyl)-di-ether.

The dyestuffs which can be obtained according to the process of the invention are new and are eminently suitable, optionally also in admixture with one another, for the dyeing and printing of synthetic fibres or fabrics, for example, of those obtained from cellulose triacetate, polyamides and, preferably, from aromatic polyesters. They are dyed or printed according to the methods customarily used for these fibres. Cellulose triacetate and polyamide fibres can be dyed at about 100° C., optionally in the presence of the conventional auxiliaries. When fibres of aromatic polyesters are dyed, for example, polyethylene glycol terephthalate, the usual carriers may be added or the dyeing process may be carried out without the addition of a carrier at 120 to 130° C. under pressure. The dyeings can also be fixed by a short heat treatment at 190 to 220° C.

It is advantageous to convert the dyestuffs before use according to conventional methods into a finely divided estate, e.g. by grinding or kneading, preferably in the presence of customary dispersing agents.

According to the above-mentioned process there are obtained on the aforesaid fibres with the dyestuffs of the Formula (I) strong, clear red dyeings of very good fastness properties, particularly excellent fastness to light, sublimation and thermofixing.

The parts mentioned in the examples are parts by weight if not otherwise indicated.

EXAMPLE 1

Dyestuff of the formula

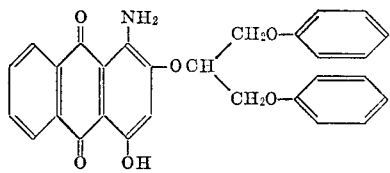

(a) 100 parts glycerol-1,3-diphenyl ether, 20 parts by volume dimethyl formamide and 2 parts potassium hydroxide are heated at 130° C. for 3½ hours with 10 parts 1-amino-2-phenoxy-4-hydroxy-anthraquinone. After completion of the reaction, the mixture is cooled to 80° C. and admixed with 150 parts by volume methanol and 5 parts by volume glacial acetic acid. After the mixture has been allowed to stand for some hours in an ice-bath, the precipitated red dyestuff is filtered off with suction and washed with methanol and water. There are obtained 11.1 parts of a dyestuff of the above formula which, after recrystallisation from ethyl acetate, melts at 127–128° C. Upon the addition of water, a further 2.6 parts of the mentioned dyestuff are obtained from the methanolic filtrate.

(b) 1 part of the above dyestuff, which was previously converted into a finely divided state in the presence of dispersing agents, is dispersed in 4000 parts of water. In the resulting dyebath 100 parts polyester fibres (polyethylene terephthalate) are dyed at boiling temperature for 120 minutes in the presence of 15 parts o-cresotic acid methyl ester as carrier. A clear red dyeing of very good fastness to light and sublimation is obtained.

EXAMPLE 2

Dyestuff of the formula

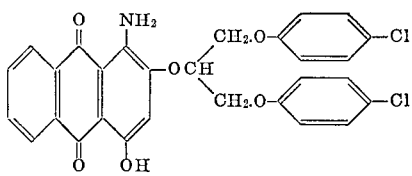

100 parts glycerol-1,3-di-(p-chlorophenyl)-ether are heated at 130° C. for 10 hours together with 2 parts sodium hydroxide, 10 parts 1-amino-2-p-chlorophenoxy-4-hydroxy-anthraquinone and 20 parts dimethyl formamide. After cooling the mixture to 80° C., it is diluted with 150 parts by volume methanol, acidified with 3 parts by volume of a 10% hydrochloric acid and, after stirring for several hours at room temperature, filtered off with suction. The resultant dyestuff is washed with methanol and water and dried at 90° C. 13.4 parts of a dyestuff of the above formula are obtained which, after recrystallisation from pyridine, melts at 151–152° C.

(b) A fabric of polyester fibres (polyethylene terephthalate) is impregnated on the foulard with a liquor which contains, per litre, 20 g. of the dyestuff of the above constitution, which was previously converted into a finely dispersed form in the presence of dispersing agents. The fabric is squeezed until a weight increase of 70% is obtained and dried at 100° C. The fabric is subsequently treated with hot air at 190–220° C. for 60 seconds in order to fix the dyeing, it is rinsed, washed hot and dried. An intense red dyeing of very good fastness to light, sublimation and rubbing is obtained.

EXAMPLE 3

Dyestuff of the formula

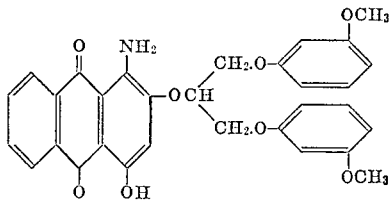

(a) 100 parts glycerol - 1,3 - di-(m-methoxyphenyl)-ether, 20 parts by volume dimethyl formamide and 2 parts potassium hydroxide are heated at 135–140° C. for 8 hours together with 10 parts 1-amino-2-phenoxy-4-hydroxyanthraquinone. After the addition at about 80° C. of 250 parts by volume methanol and 3 parts by volume glacial acetic acid, the mixture is cooled with ice. The precipitated red dyestuff is filtered off with suction while cold, washed with methanol and water and dried at 90° C. 14.4 parts of a dyestuff of the above constitution are obtained which, after recrystallisation from glycol monoethyl ether, melts at 115–117° C.

With 1 part of this dyestuff, previously converted into a finely divided form with the conventional auxiliaries, 100 parts polyester fibres (obtained by polycondensation of terephthalic acid and dimethylolcyclohexane) are dyed in 3000 parts of water at 125–130° C. for one hour under pressure. An intense red dyeing of very good fastness properties is obtained.

EXAMPLE 4

Dyestuff of the formula

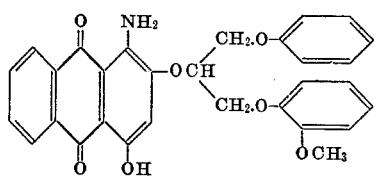

(a) 100 parts glycerol-1-phenyl-3-(o-methoxyphenyl)-diether, 2 parts potassium hydroxide and 10 parts 1-amino-2-phenoxy-4-hydroxy-anthraquinone are heated at 130° C. for 4½ hours in the presence of 20 parts by volume N-methyl-pyrrolidone. When the reaction is completed, the mixture is diluted with 150 parts by volume ethanol and 3 parts by volume glacial acetic acid, filtered off with suction while cold, and the residue is washed with methanol and water. There are obtained 13.7 parts of a dyestuff of the above formula, which melts at 134–135° C. after recrystallisation from pyridine.

With 1 part of the dyestuff obtained according to Example 4(a), which was previously converted into a finely divided form with the auxiliaries customarily used for this purpose, 100 parts polyester fibres (polyethylene terephthalate) are dyed for 1 hour in 3000 parts of water at 125–130° C. under pressure. A clear red dyeing of very good fastness properties is obtained.

EXAMPLES 5–24

In analogy with the methods described in Examples 1–4, the dyestuffs set out in Table 1 are produced, which are characterised by the melting points there indicated. The shades specified in the table are obtained on polyethylene terephthalate fibres.

Dyestuff of the formula

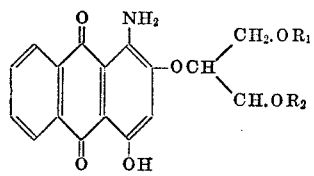

TABLE 1

| Example | $R_1$ | $R_2$ | Melting point (° C.) | Shade |
|---|---|---|---|---|
| 5 | 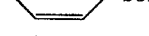—SCH$_3$ | —SCH$_3$ | 144–5 | Red. |
| 6 | —CH$_3$ | —CH$_3$ | 146–7 | Red. |
| 7 | 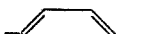 (CH$_3$) |  (CH$_3$) | 107–8 | Red. |
| 8 | 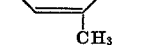 | 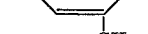 | 172–3 | Red. |
| 9 |  | 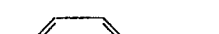 | 230–1 | Red. |
| 10 | 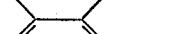—C(CH$_3$)$_3$ | 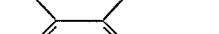—C(CH$_3$)$_3$ | 132–3 | Red. |
| 11 | 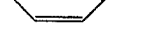 (OCH$_3$) | 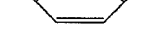 (OCH$_3$) | 181–2 | Red. |
| 12 |  (Cl) |  (Cl) | 134–5 | Red. |
| 13 | 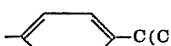—Cl | —Cl | 110–11 | Red. |
| 14 | 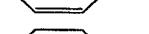 (OC$_2$H$_5$) | 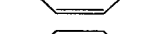 (OC$_2$H$_5$) | 166–7 | Red. |
| 15 | —COCH$_3$ | —COCH$_3$ | 201–2 | Red. |
| 16 | 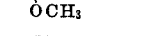 (Cl, CH$_3$) | 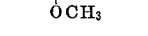 (Cl, CH$_3$) | 142–3 | Red. |

TABLE 1—Continued

| Example | R₁ | R₂ | Melting point (° C.) | Shade |
|---|---|---|---|---|
| 17 | 2,4-dichlorophenyl | 2,4-dichlorophenyl | 162–3 | Red. |
| 18 | phenyl | 4-chlorophenyl | 110–12 | Red. |
| 19 | phenyl | 4-methylthiophenyl (—SCH₃) | 98–9 | Red. |
| 20 | phenyl | 4-methylphenyl (—CH₃) | 95–6 | Red. |
| 21 | phenyl | biphenyl | 157–8 | Red. |
| 22 | 2-ethoxyphenyl (OC₂H₅) | 4-chlorophenyl | 127–8 | Red. |
| 23 | 2-methoxyphenyl (OCH₃) | 4-chlorophenyl | 134–5 | Red. |
| 24 | 4-methylphenyl (—CH₃) | 2-chlorophenyl | 116–7 | Red. |

EXAMPLE 25

Dyestuff of the formula

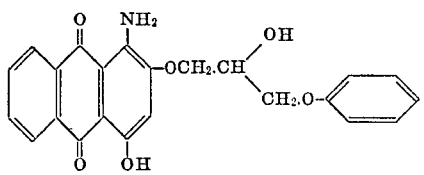

(a) 80 parts glycerol-1-monophenyl ether, 2 parts potassium hydroxide and 10 parts 1-amino-2-phenoxy-4-hydroxy-anthraquinone are heated at 130° C. for 3½ hours. The reaction mixture is then cooled to 60–70° C. and mixed with 120 parts by volume methanol and 50 parts by volume 2 N hydrochloric acid. The precipitated red dyestuff is filtered off with suction and washed with methanol and water. There are obtained 10.2 parts of a dyestuff of the above constitution which melts at 202–203° C. after recrystallisation from pyridine.

(b) The same dyestuff is obtained when, instead of 1-amino-2-phenoxy-4-hydroxy-anthraquinone, 1-amino-2-methoxy-4-hydroxy-anthraquinone is used or when the potassium hydroxide is replaced by sodium hydroxide.

(c) With 1 part of the dyestuff previously converted into a finely divided form with the auxiliaries customarily used for this purpose, 100 parts polyester fibres (polyethylene terephthalate) are dyed at 125–130° C. under pressure for 1 hour in 3000 parts of water. An intense red dyeing of very good fastness properties is obtained.

EXAMPLE 26

(a) 50 parts glycerol-1-monophenyl ether are heated to 120° C. in a nitrogen atmosphere together with 3.5 parts potassium hydroxide. After the introduction of 5 parts sodium 1-amino-4-hydroxy-anthraquinone-2-sulphonate, the mixture is stirred at 130° C. for 4 hours, mixed with 50 parts by volume methanol, 10 parts by volume water and 2 parts by volume glacial acetic acid; the precipitate is filtered off with suction after cooling. 3.5 parts of a dyestuff are thus obtained which is identical with the compound mentioned under 25(a).

(b) When a fabric of polyester fibres (polyethylene terephthalate) is dyed according to the method indicated under 2(b) with the dyestuff obtained according to Example 26(a), an intense red dyeing of very good fastness properties is obtained.

EXAMPLE 27

(a) 100 parts glycerol-1-monophenyl ether, 5 parts phenol, 2 parts potassium hydroxide and 10 parts 1-amino-2-bromo-4-hydroxy-anthraquinone are heated at 130° C. until starting material can no longer be detected. After termination of the reaction, the mixture is cooled to about 80° C. and mixed with 100 parts by volume methanol, 20 parts by volume water and 2 parts by volume glacial acetic acid. The precipitated dyestuff is filtered off with suction when cold and washed with a mixture of equal parts of methanol and water. 10.1 parts of a compound are obtained which is identical with that described under 25(a).

(b) With 1 part of the dyestuff thus obtained, which was previously converted into a finely divided form by usual methods, 100 parts of a polyamide fabric are dyed at 100° C. for 1 hour in 4000 parts of water. The fabric is subsequently rinsed first hot and then cold and dried. An intense bluish red dyeing of very good fastness to washing and light is obtained.

EXAMPLE 28

Dyestuff of the formula

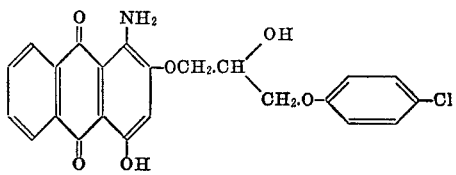

(a) 60 parts glycerol-1-mono-(p-chlorophenyl)-ether, 2 parts potassium carbonate and 6 parts 1-amino-2-p-chlorophenoxy-4-hydroxy-anthraquinone are heated at 150° C. for 2 hours. After cooling the mixture to 80° C., it is admixed with 100 parts by volume methanol. The precipitated dyestuff is filtered off with suction, washed with methanol and water and dried. There are obtained 5.7 parts of a dyestuff of the above constitution, which melts at 228–229° C. after recrystallization from pridine and yields on polyethylene terephthalate fabrics a clear red dyeing of very good fastness properties.

(b) 50 parts glycerol-1-mono-(p-chlorophenyl)-ether, 50 parts by volume pyridine, 2 parts potassium hydroxide and 8 parts 1-amino-2-phenoxy-4-hydroxy-anthraquinone are heated at boiling temperature for 10 hours. The reaction mixture is diluted with 50 parts by volume methanol and 50 parts by volume of water, the precipitate is filtered off with suction and washed with methanol and water. After drying, 7.5 parts of a dyestuff are obtained which is identical with that prepared according to 28(a).

EXAMPLES 29–33

In analogy with the method described in Examples 25–28, the compounds set out in Table 2 are produced with the melting points there indicated. The specified shades are obtained on fabrics of polyethylene terephthalate.

Dyestuff of the formula

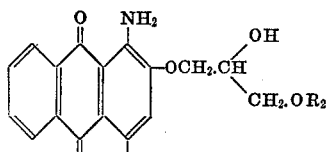

TABLE 2

| Example | $R_2$ | Melting point (° C.) | Shade |
|---|---|---|---|
| 29 | —⟨⟩—SCH₃ | 223–4 | Red. |
| 30 | —⟨H⟩ | 183–4 | Red. |
| 31 | —⟨⟩ OCH₃ | 209–10 | Red. |
| 32 | —⟨⟩ C₂H₅ | 197–9 | Red. |
| 33 | —⟨⟩—CH₃ CH₃ | 222–3 | Red. |
| 34 | Cl —⟨⟩—Cl | 243–4 | Red. |
| 35 | CH₃ —⟨⟩—SCH₃ | 201–2 | Red. |
| 36 | —⟨⟩⟨⟩ | 237–8 | Red. |

EXAMPLE 37

Dyestuff of the formula

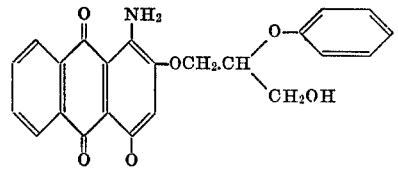

(a) 35 parts glycerol-2-monophenyl ether, 1.5 parts potassium hydroxide and 6 parts 1-amino-2-phenoxy-4-hydroxyanthraquinone are heated at 130° C. for 3 hours. Into the reaction mixture cooled to 80° C., 60 parts by volume methanol and 10 parts by volume of water are introduced, the precipitated dyestuff is filtered off with suction and washed with methanol and water. After drying, there are obtained 6.8 parts of a compound of the above constitution which melts at 176–177° C. after recrystallisation from pyridine.

(b) A previously cleaned and thermofixed fabric of polyethylene terephthalate is printed with a paste consisting of the following components:

20 g. of the dyestuff obtained according to 37(a) and converted into a finely divided form
520 g. water
450 g. crystal gum (1:2)
10 g. cresotic acid methyl ester.

The dyestuff is fixed by treating the printed and dried material with hot air at 200° C. for 40 seconds. After soaping, rinsing and drying, a clear red print of very good fastness to light and sublimation is obtained.

(c) With 1 part of the dyestuff prepared according to Example 37(a) and converted into a finely divided form with auxiliaries customarily used for this purpose, 6 parts of a fatty alcohol sulphonate and 3000 parts of water, a dyebath is prepared in which 100 parts cellulose triacetate fibres are dyed at 100° C. for 1 hour. A yellowish red dyeing of very good fastness to washing, thermofixing and light is obtained.

EXAMPLE 38

Dyestuff of the formula

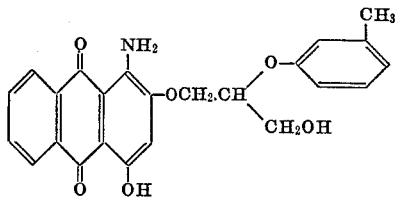

When the glycerol-2-monophenyl ether used in Example 37(a) is replaced by the corresponding glycerol-2-mono-m-cresyl ether and the procedure is otherwise followed as described in this example, a dyestuff of the above constitution is obtained which melts at 149–150° C. after recrystallisation from pyridine.

We claim:

1. Anthraquinone dyestuff of the formula:

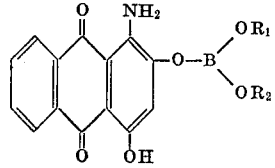

in which B stands for the radical

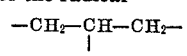

or for the radical

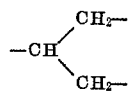

$R_1$ and $R_2$ stand for members selected from the group consisting of phenyl, naphthyl, substituted phenyl, and substituted naphthyl wherein the substituents are 1 or 2 members selected from the group consisting of chlorine, bromine, lower alkyl, lower alkoxy, lower alkylcarbonyl, lower alkylthio, hydroxy and phenyl; and wherein $R_1$ may additionally be hydrogen and $R_2$ may additionally be cyclohexyl and substituted cyclohexyl wherein the substituents in said cyclohexyl radical are selected from the group designated for the phenyl and naphthyl radicals.

2. Anthraquinone dyestuff of claim 1 wherein

stands for $$-CH_2-CH-CH_2-OR$$
$$\phantom{-CH_2-}|\phantom{-CH_2-}$$
$$\phantom{-CH_2-CH-}OR$$

in which one R is hydrogen and the other R is selected from the group consisting of $R_1$ and $R_2$.

3. Anthraquinone dyestuff of claim 1 wherein

stands for

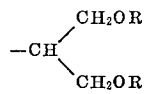

in which R stands for the same or for different members selected from the group consisting of phenyl, substituted phenyl, naphthyl and substituted naphthyl.

References Cited

UNITED STATES PATENTS

| 2,992,240 | 7/1961 | Lodge | 260—380 |
| 982,267 | 2/1965 | Great Britain | 260—380 |

LORRAINE A. WEINBERGER, Primary Examiner

R. GERSTL, Assistant Examiner

U.S. Cl. X.R.

8—39, 40; 260—380, 613 R